United States Patent [19]

Day et al.

[11] Patent Number: 5,207,734
[45] Date of Patent: May 4, 1993

[54] ENGINE EXHAUST SYSTEM FOR REDUCTION OF HYDROCARBON EMISSIONS

[75] Inventors: J. Paul Day, Big Flats; Louis S. Socha, Jr., Painted Post, both of N.Y.

[73] Assignee: Corning Incorporated, Corning, N.Y.

[21] Appl. No.: 734,146

[22] Filed: Jul. 22, 1991

[51] Int. Cl.⁵ .............................................. F02M 33/02
[52] U.S. Cl. ....................................... 60/278; 55/159; 55/389; 123/519; 123/520
[58] Field of Search .................. 60/278, 279, 283, 297; 123/519, 520, 521, 568; 55/159, 389

[56] References Cited

U.S. PATENT DOCUMENTS

| | | |
|---|---|---|
| 3,476,508 | 11/1969 | Kearby et al. |
| 3,618,314 | 11/1971 | Krebs .................................. 55/389 |
| 3,674,441 | 7/1972 | Cole ..................................... 60/297 |
| 3,699,683 | 10/1972 | Tourtellotte et al. ................. 60/297 |
| 3,757,521 | 9/1973 | Tourtellotte ........................ 472/171 |
| 3,896,616 | 7/1975 | Keith et al. ............................ 60/274 |
| 3,963,827 | 6/1976 | Acres et al. ......................... 423/239 |
| 4,683,214 | 7/1987 | Angevine et al. ..................... 502/66 |
| 4,985,210 | 1/1991 | Minami ............................... 422/169 |
| 5,021,071 | 6/1991 | Reddy ................................. 123/518 |
| 5,078,979 | 1/1992 | Dunne .................................. 60/297 |

FOREIGN PATENT DOCUMENTS

| | | |
|---|---|---|
| 1205980 | 6/1986 | Canada . |
| 0002791 | 7/1979 | European Pat. Off. . |
| 0003818 | 9/1979 | European Pat. Off. . |
| 2214772 | 9/1973 | Fed. Rep. of Germany . |
| 544 | 1/1981 | Japan .................................. 123/519 |
| 2189309 | 8/1987 | Japan . |
| 255513 | 11/1987 | Japan .................................... 60/279 |
| 68713 | 3/1988 | Japan . |
| 257710 | 10/1989 | Japan . |
| 2-75327 | 3/1990 | Japan . |
| 2-126937 | 5/1990 | Japan . |
| 2-135126 | 5/1990 | Japan . |
| 1405406 | 9/1975 | United Kingdom . |
| 2017520A | 10/1979 | United Kingdom . |

*Primary Examiner*—Douglas Hart
*Attorney, Agent, or Firm*—Gary H. Levin; Richard N. Wardell

[57] ABSTRACT

An engine exhaust system disclosed which is designed to reduce hydrocarbon emissions caused by the evaporation of fuel from the fuel tank and by the inefficiency of combustion and catalytic conversion during cold engine start-up. This system utilizes molecular sieves, such as high-silica zeolites, which adsorb hydrocarbons evaporating from the fuel tank or emitted during engine start-up, before the catalytic converter has attained an effective operating temperature. This system is designed so that hydrocarbons that would otherwise be emitted to the atmosphere from the fuel tank or by passing through the converter unconverted are held within the system either for combustion in the engine or passage through the converter once it is operating efficiently.

23 Claims, 3 Drawing Sheets

ENGINE EXHAUST SYSTEM FOR REDUCTION OF HYDROCARBON EMISSIONS

BACKGROUND OF THE INVENTION

This invention relates to an automotive engine exhaust system designed to reduce hydrocarbon emissions caused by the evaporation of fuel from the fuel tank and by the inefficiency of combustion and catalytic conversion during cold engine start-up. More specifically, the invention is directed to an engine exhaust system, generally for automobiles and trucks, that includes molecular sieves positioned within the system to trap hydrocarbons evaporating from the fuel tank and to hold other hydrocarbon pollutants generated by the engine to prevent their discharge into the atmosphere until the catalytic converter in the system reaches an efficient operating temperature for conversion of the hydrocarbons.

As part of the pollution control systems now used, automobiles are equipped with a canister of activated carbon for the purpose of adsorbing hydrocarbon vapors that are emitted from the fuel tank or carburetor by natural evaporation. Hydrocarbon vapors so generated while the engine is idle are vented to the canister to be adsorbed on the activated charcoal and thereby prevented from being emitted to the atmosphere. The charcoal is later purged during engine operation by utilizing the engine vacuum to draw air through the charcoal, thus desorbing the hydrocarbons, after which the air/hydrocarbon mixture is drawn into the engine and burned as a component of the engine's total fuel feed.

Although this system for the adsorption of evaporating hydrocarbons is generally effective, there are inefficiencies based primarily on the geometric arrangement of the activated charcoal in the canister as well as on the amount of charcoal itself. As used today, the activated charcoal is arranged in the canister as a bed of granulated material, and because of the non-uniformity of gas diffusion through the bed, the charcoal often reaches its practical (if not theoretical) saturation point. Any further hydrocarbon vapors generated by evaporation then pass through the bed unadsorbed and are vented to the atmosphere. Moreover, the purge is often not totally effective. Desorption is more efficiently accomplished at an elevated temperature, but since the charcoal system generally operates at ambient temperature, the charcoal may not be fully purged, causing saturation to be reached earlier during the next adsorption period. Although one possible solution is the use of a greater volume of charcoal, cost and space constraints make this undesirable.

Another problem with the emission-control systems in present use in automobiles resides in the fact that the precious metal catalysts used in standard catalytic converter systems are generally ineffective at ambient temperature and must be heated, generally to within the range of 300°-400° C., before they are activated. Typically, the catalyst is heated by contacting it with the high temperature exhaust gases from the engine. Continuous contact with those gases and the exothermic nature of the oxidation reactions occurring at the catalyst combine to elevate and maintain the catalyst temperature. The temperature at which a catalytic converter can convert 50% of carbon monoxide, hydrocarbons, or nitrogen oxides (NOx) passing through it is referred to as the "light-off" temperature of the converter.

In most automotive engines, the amount of carbon monoxide and hydrocarbons in the exhaust gas is higher during start-up than after sustained engine operation because, at the outset, the engine efficiency is low. For example, as noted in U.S. Pat. No. 3,896,616, the amount of carbon monoxide at start-up can be 3–10 percent by volume, or more, (versus 0.5–3 percent during normal engine operation), and the amount of hydrocarbons can typically be about 750–2,000 parts per million (ppm) (versus about 100–750 ppm during normal operation). Accordingly, a significant portion of the total emission generated by the typical automotive engine is generated in the first few minutes of operation. Unfortunately, at start-up, when the catalytic converter is most needed, it can be relatively ineffective because it will not yet have reached a temperature at which it is efficiently active.

There have been numerous suggestions for avoiding the pollution problems inherent in engine start-up. For example, it has been suggested that the catalytic converter be placed as close to the engine as possible so that the exhaust contacts the catalyst before it loses heat to the environment, thereby more quickly raising the temperature of the catalyst to operating level. However, because of limitations of space in most vehicles, locating the entirety of catalyst adjacent the engine is difficult.

U.S Pat. No. 3,896,616 suggests the use of two converters, an initial catalyst, preferably in a converter vessel placed near the engine, and a second, downstream catalytic converter. It is taught that the initial catalyst, being close to the engine, will reach its effective operating temperature significantly sooner than the main, down-stream catalyst. On cold engine start-up, however, during the period before the initial catalyst reaches its effective temperature, substantial quantities of pollutants would still be discharged to the atmosphere. In addition, because the initial catalyst is positioned close to the engine, it is susceptible to being over-heated resulting in degradation of the metal catalyst.

Accordingly, there remains a need for an engine exhaust system that can effectively reduce evaporative emissions and reduce the amounts of pollutants discharged to the atmosphere during the critical engine start-up period.

SUMMARY OF THE INVENTION

The present invention provides an engine exhaust system that uses molecular sieve materials, preferably zeolites, in place of presently-used activated carbon materials to prevent the passive emission to the atmosphere of hydrocarbons evaporating from fuel in the fuel tank. In other embodiments, the molecular sieve materials are also used to adsorb hydrocarbons in the engine exhaust stream and to maintain them within the exhaust system until the catalytic converter attains an efficient operating temperature for conversion of the hydrocarbons to less noxious materials. This embodiment of the invention is intended to eliminate or substantially reduce hydrocarbons whose emission to the atmosphere during engine start-up is not prevented by existing exhaust systems.

In a first embodiment, the invention is directed to an improved engine system having means for controlling evaporative emissions wherein the system comprises an engine, a fuel tank for storing hydrocarbon fuel, adsorbing means for adsorbing hydrocarbon vapors generated by evaporation of the fuel, and air-purge means for conveying purge air through the adsorbing means and then to the engine. The improvement is characterized in that (1) the adsorbing means is a molecular sieve capable of adsorbing hydrocarbon vapors from the fuel and further capable of having the hydrocarbons desorbed therefrom upon heating to a desorbing temperature, and (2) the air-purge means includes means for heating the purge air prior to conveying the purge air through the molecular sieve materials.

In a variation of the first embodiment, a portion of the engine exhaust is used to purge the molecular sieves. In this embodiment of the invention is directed to an engine exhaust system for reducing evaporative emissions of a hydrocarbon fuel where the system comprises:

an engine;

a fuel tank, including a vapor space, for storing hydrocarbon fuel for the engine;

molecular sieve means for adsorbing hydrocarbons evaporating from the fuel, where the molecular sieves are capable of having hydrocarbons desorbed therefrom upon heating to a desorption temperature;

vapor-conveyance means for providing communication between the molecular sieves and the vapor space of the fuel tank;

a catalytic converter for substantially converting unburned hydrocarbons in the engine exhaust stream to water and carbon dioxide; and conveying means for selectively conveying the engine exhaust stream within the engine exhaust system, characterized in that, for a period of time at least until the molecular sieves attain their desorption temperature, the conveying means bifurcates the exhaust stream so as to (i) convey a minor portion of the exhaust stream through the molecular sieves and thereafter back to the engine, wherein the conveyed portion of the exhaust is sufficient to heat the molecular sieves to the desorption temperature and to effect desorption of hydrocarbons; and (ii) discharge the remainder of the engine exhaust stream from the exhaust system, bypassing the molecular sieves.

A further embodiment of the invention is directed to an engine exhaust system for reducing evaporative emissions of a hydrocarbon fuel and for substantially converting hydrocarbons in a hydrocarbon-containing engine exhaust stream to water and carbon dioxide. The system of this embodiment comprises an engine;

a fuel tank, including a vapor space, for storing hydrocarbon fuel for the engine;

molecular sieve means for adsorbing hydrocarbons evaporating from the fuel and for adsorbing hydrocarbons in the engine exhaust stream, the molecular sieves being further capable of having hydrocarbons desorbed therefrom upon heating to a desorption temperature;

vapor-conveyance means for providing communication between the molecular sieves and the vapor space of the fuel tank;

catalytic converter means for substantially converting hydrocarbons in said exhaust stream to water and carbon dioxide, said converter means having a light-off temperature; and conveying means for selectively conveying said engine exhaust stream within said engine exhaust system characterized in that said conveying means (i) for a first period of time until said molecular sieve means attains its desorption temperature, conveys substantially all of the exhaust from said engine through said converter and said molecular sieve means and thereafter bifurcates said exhaust stream so as to discharge a major portion thereof from the system and to recirculate the remainder thereof to said engine; and (ii) for a second period of time thereafter, conveys the exhaust from said engine through said converter means, and thereafter bifurcates said exhaust stream so as to (a) recirculate a portion of said exhaust stream through said molecular sieve means and thereafter to said engine, said recirculated portion being sufficient to maintain said molecular sieve means at least at its desorption temperature and to effect desorption of hydrocarbons therefrom, and (b) discharge the remainder of said stream from said system.

DETAILED DESCRIPTION OF THE INVENTION

The novel engine exhaust system of this invention is based on the use of a molecular sieve to control the passive emission of hydrocarbons, generated by the evaporation of hydrocarbon fuels from the fuel tank, in place of the activated charcoal that is now used. In another aspect of the invention, the molecular sieve material performs the additional function of adsorbing, from the engine exhaust, hydrocarbons that have not been completely burned in the engine and withholding them from discharge from the system until the catalytic converter reaches an operating temperature at which it can efficiently convert the hydrocarbons to a non-polluting form.

The molecular sieves useful in the practice of this invention are those that are capable of selectively adsorbing and desorbing hydrocarbons. The hydrocarbon-adsorbing capability is provided by channels and pores sized at the atomic level. The molecular sieves most suited for use herein are those that adsorb hydrocarbons preferentially to water.

The preferred molecular sieves are crystalline zeolites high in silica content, such as hydrated aluminosilicates whose structures are based on a theoretically limitless three-dimensional network of $AlO_x$ and $SiO_y$ tetrahedra linked by the sharing of oxygen atoms. Suitable materials are described, for example, in U.S. Pat. No. 4,297,328, (the disclosure of which is herein incorporated by reference), as those zeolites having a $SiO_2/Al_2O_3$ molar ratio which exceeds about 10 and preferably is in the range of about 70–200. Representative of the high-silica zeolites are "silicalite", ZSM-5, ZSM-8, ZSM-11, ZSM-12, Hyper Y, ultrastabilized Y, Beta, mordenite and erionite. In addition, the high-silica zeolites prepared as described in the illustrative examples of U.S. Pat. No. 4,297,328, are also suitable.

"Silicalite" is a crystalline silica composition having a hydrophobic/organophilic characteristic that permits its use for selectively adsorbing organic materials preferentially to water. Silicalite is more completely described in U.S. Pat. No. 4,061,724, the disclosure of which is herein incorporated by reference. ZSM-5, ZSM-8, ZSM-11 and ZSM-12 are crystalline zeolites and are disclosed in U.S. Pat. No. 3,702,886, in British Specification No. 1,334,243, published Oct. 17, 1973, in U.S. Pat. No. 3,709,979, and in U.S. Pat. No. 3,832,449, respectively. The disclosures of each of these patents and publications are herein incorporated by reference.

Ultrastabilized Y is a form of zeolite Y which has been treated to give it the organophilic characteristic of the above-mentioned adsorbents. A description of ultrastabilized Y may be found in "Crystal Structures of Ultrastable Faujasites", Advances in Chemistry Sciences, No. 101. American Chemical Society, Wash. D.C., pages 266-278 (1971).

Novel high-silica zeolite compositions suitable for use in this invention are also described in U.S. Pat. No. 4,257,885, herein incorporated by reference. These zeolites have a chemical composition expressed in terms of moles of oxides as follows:

Al2O3:0.8-3.0 M2O:10-100 SiO2:0-40 H2O.

Other zeolites having the properties described herein may also be used without departing from the scope of this invention.

The zeolite can be utilized in any number of forms. For example, the zeolite can be crystallized directly into powdery or micro-pellet form or pre-formed zeolite may be embedded in or coated on porous ceramic pellets or beads. Such pelletized zeolite, however, provides high resistance to flow, so it is preferred to provide the zeolite in the form of, or in combination with, a porous substrate. This is accomplished, for example, by forming a porous structure directly from the zeolite itself, by embedding or coating the zeolite on a ceramic substrate, such as an extruded honeycomb, or by crystallizing the zeolite on the surface of a ceramic substrate.

A method for forming zeolites on the surface of a substrate is disclosed in U.S. Pat. No. 3,730,910, herein incorporated by reference. According to this method, a substrate, consisting of an inorganic oxidic component selected from silicon oxides, aluminum oxides and mixtures thereof, is contacted with a solution selected from silicate solutions or aluminate solutions including a zeolite seed slurry, the solution component being in a concentration ratio to said substrate inorganic oxidic component to form a zeolite. The resulting mixture is heated to yield a zeolite surfaced substrate.

U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution. The clay in the extrudate crystallizes to form a coherent particle that is essentially all zeolite.

U.S. Pat. No. 4,631,267, herein incorporated by reference, discloses a method for producing a monolithic support structure for zeolite by (a) mixing into a substantially homogeneous body (i) a zeolite, (ii) a precursor of a permanent binder for the zeolite selected from the group consisting of alumina precursors, silica precursors, titania precursors, zirconia precursors and mixtures of these, the binder precursor having a crystallite size below 200 angstroms, and (iii) a temporary binder; and (b) heating the body to a temperature of from 500° to 1000° C. The mixed body of step (a) may preferably be formed into the shape of a honeycomb. Preferably, the permanent binder precursor is a silicone resin, a suspension of a hydrated alumina, aluminum, chlorohydrate or a suspension of hydrolyzed aluminum isopropoxide, and the temporary binder is methyl cellulose.

A method for preparing a honeycomb of zeolite embedded in a ceramic matrix is disclosed in U.S. Pat. No. 4,657,880, herein incorporated by reference. According to this method, a monolithic support for the zeolite is prepared which has a first substantially continuous sintered phase of ceramic material of high strength, and a second discontinuous phase of the zeolite embedded within the ceramic phase. The zeolite phase is first prepared by mixing a zeolite with a binder, heating the mixture to a temperature up to 250° C. to dry or cure it, and forming the dried or cured mass into coarse particles having a median diameter of 50 to 250 microns. The monolithic support is prepared by mixing 15-50 parts by weight of the particles with 50-85 parts by weight of a ceramic support material, forming this mixture into a honeycomb shape, and heating the shaped mixture to a temperature and for a time sufficient to sinter the ceramic. Preferred binders include silicone resin, polymerized furfuryl alcohol, acrylic resin, methyl cellulose, and polyvinyl alcohol. Preferred ceramic materials include cordierite, mullite, clay, talc, titania, zirconia, zirconia-spinel, alumina, silica, lithium aluminosilicates, and alumina-zirconia composites.

U.S. Pat. No. 4,637,995, herein incorporated by reference, discloses a method for preparing a monolithic zeolite support comprising a ceramic matrix having zeolite dispersed therein. According to this method, a substantially homogeneous body comprising an admixture of (i) a ceramic matrix material, in particulate form finer than 200 mesh, selected from cordierite, mullite, alpha-alumina, lithium aluminosilicate, and mixtures of these, and (ii) a zeolite having a crystallite size no larger than 0.2 microns and a surface area of at least 40 m2/g is prepared. The mixed body is formed into a desired shape, such as a honeycomb, and heated to sinter the ceramic matrix material.

A method for crystallizing zeolites on the surfaces of monolithic ceramic substrates is disclosed in U.S. Pat. No. 4,800,187, herein incorporated by reference. According to this method, the ceramic substrate, such as a honeycomb, is treated, in the presence of active silica, with a caustic bath to crystallize the silica to a zeolite form. In one embodiment of the disclosed invention, a monolithic ceramic substrate having an oxide composition consisting essentially of 45-75% by weight silica, 8-45% by weight alumina, and 7-20% by weight magnesia is hydrothermally treated with an aqueous solution comprising sodium oxide or hydroxide, alumina and optionally active silica at a temperature and for a time sufficient to crystallize a desired zeolite on the surfaces of the substrate. In a second embodiment, a monolithic ceramic substrate is coated with a layer of active silica, the coating being 1-45% of the weight of the coated substrate, and then hydrothermally treated with an aqueous solution comprising sodium oxide or hydroxide and alumina to crystallize the active silica to the desired zeolite and provide the zeolite on the surfaces of the substrate. In a third embodiment, a sintered monolithic body, which comprises a porous ceramic material and 1-40% by weight, based on the total body weight, of active silica embedded within the ceramic material, is hydrothermally treated with an aqueous solution comprising sodium oxide or hydroxide and optionally alumina to crystallize a desired zeolite on the surface of the body.

The molecular sieve means should contain sufficient zeolite (or other molecular sieve material) to adsorb the total amount of hydrocarbon that is generally unconverted during start-up of the typical automotive engine system as well as hydrocarbon from evaporative emission from the fuel tank. Hydrocarbons from the latter source will generally account for the major portion of material that the sieves will be required to adsorb. Although it will be recognized that the amount of evaporative emission will depend on such factors as temperature, the kind of fuel used, the time during which the engine is idle, the size of the fuel tank, etc., as much as 60-100 grams of hydrocarbon can be evaporated from a typical fuel tank under long exposure to high ambient temperature. Hydrocarbons from cold start-up can add as much as 10 grams to the total adsorption requirements of the sieves. The sieves useful in this invention generally can adsorb about 3 grams of hydrocarbon per 100 grams of sieve. Accordingly, in the typical engine system, for example, there should be about 2300-3700 grams of sieve in the molecular sieve means, depending on the expected conditions of operation and exposure. Generally, about 1-95% by weight of the molecular sieve means will be composed of the sieve itself, with the balance being the substrate or support material, such as the above-described ceramic support materials.

In the description of the engine exhaust systems to follow, the molecular sieves are described mostly in terms of a zeolite. Although the preferred molecular sieve is a zeolite, reference to zeolite in this description is not intended to limit the scope of the invention to the exclusion of non-zeolitic molecular sieves that function as described herein.

The engine exhaust systems to which the invention pertains are used in automobiles, light trucks, and the like, and generally incorporate at least one catalytic converter to meet the standards of existing anti-pollution regulations. The catalytic converters referred to in the description of this invention, therefore, can be any of the kind generally used in automotive emission-control systems. As such, they are capable at least of converting hydrocarbons to water and carbon dioxide. For example, noble metal catalysts, such as mixtures of platinum and palladium, are capable not only of oxidizing hydrocarbons but also of converting carbon monoxide in the engine exhaust stream to carbon dioxide. In many cases, three-way converters, which additionally convert NOx, are used. Typically, a three-way converter comprises noble metal catalysts such as platinum and/or palladium, and rhodium.

In the traditional manufacture of such catalytic converters, a substrate, generally of ceramic material, is provided with a coating of a high surface area material, generally a metal oxide media, upon which the catalytic material is actually deposited. In the formation of such systems, a sintered and hardened ceramic substrate, which can be in the shape of a honeycomb, wagonwheel, or other molded or shaped objects, or simply be in the form of pellets, is coated with a slurry of the high surface area material, after which the catalyst, such as noble metal, is applied to the slurry-coated substrate, generally by application of a solution of a salt of that metal.

More particularly, the underlying ceramic substrate can be cordierite, mullite, alumina, lithium aluminosilicates, titania, zircon, feldspar, quartz, fused silica, clays, kaolin clay, aluminum titanate solid solutions, silicates, zirconia, spinels, glasses, glass ceramics, aluminates, and mixtures thereof. The constituent ceramic materials are generally admixed with binders or shaping agents, processed, molded where applicable, and sintered, all by methods well known in the art. Coating of the substrate with the high surface area media can be effected either by immersion or dipping, followed by heat-treating the coated substrate at a temperature of 500°-600° C. Generally the weight of the slurry coating, prior to heat treatment, is about 15-30% of the weight of the coated substrate. Procedures for depositing a high surface area "wash-coat" on the previously sintered ceramic substrate are disclosed, for example, in U.S. Pat. No. 3,824,196. Following application of the slurry of high surface area material, the catalyst is applied in the manner stated above. Alternatively, a single "wash-coat" mixture of the high surface area media and the catalytic material can be applied together.

Other known methods of preparing the catalytic converters involve the incorporation of a high surface area phase, upon which to deposit precious metal catalyst, into or onto an extruded ceramic substrate. Such procedures are disclosed, for example, in U.S. Pat. Nos. 4,631,267; 4,657,880; and 4,637,995; which patents are hereby incorporated by reference. Those patents disclose methods for incorporating high surface-area material (such as aluminas, silica, spinels, titanias, zirconias, or mixtures thereof) within a sinterable ceramic support material that provides strength and integrity to the extruded shape. The catalytically active metal is deposited on the incorporated high surface-area material by methods known in the art.

Figure 1:
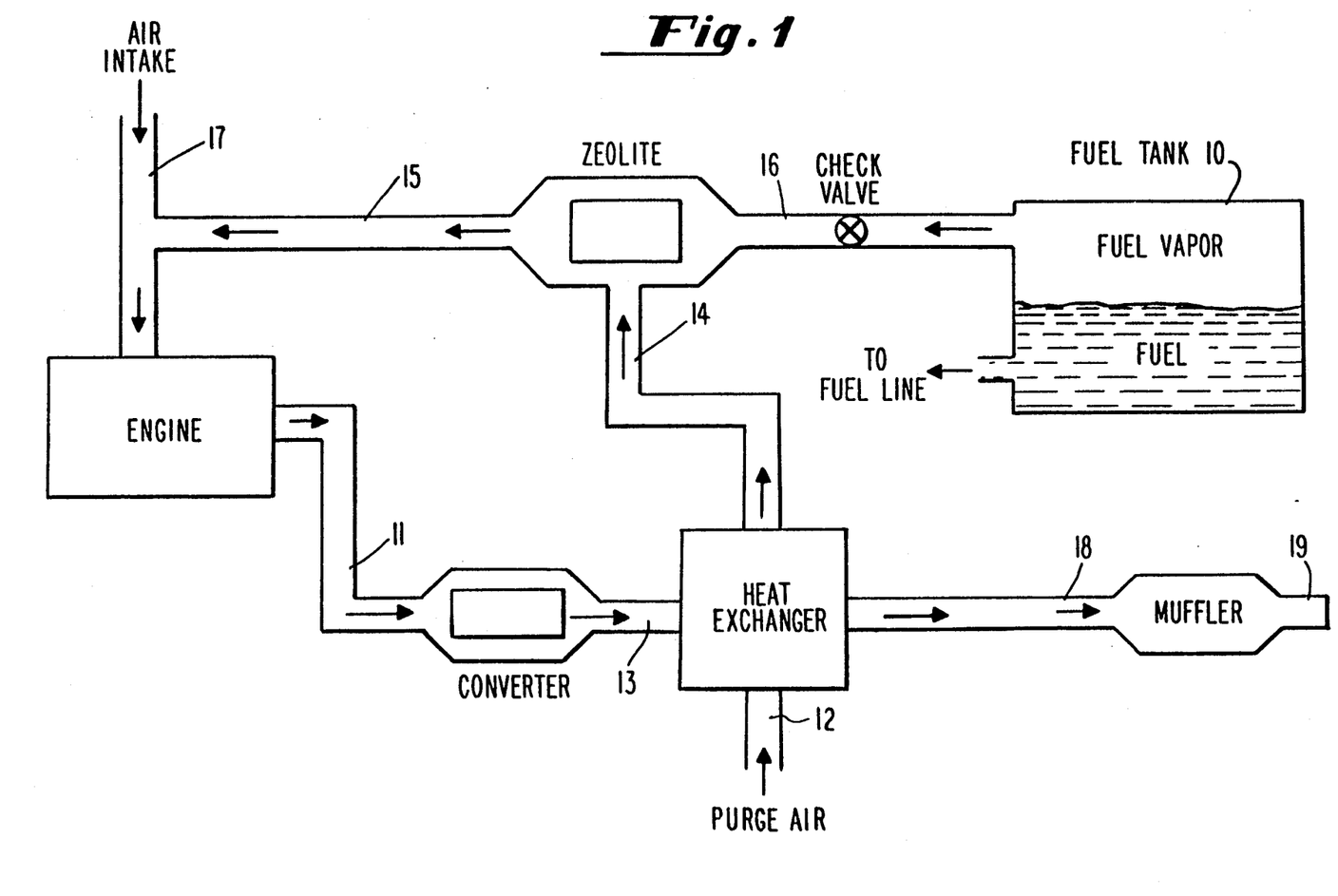
FIG. 1 is a schematic drawing of an engine exhaust system according to the invention using zeolite for the adsorption of hydrocarbons evaporating from the fuel tank and containing means for heating the purge air.

FIG. 1 schematically depicts an automotive exhaust system in which zeolites are used to adsorb hydrocarbon vapors generated by fuel evaporation and in which the purge air that desorbs the hydrocarbons and conveys them to the engine for combustion is heated prior to passage through the zeolite in order to heat the zeolite to a temperature at which hydrocarbons begin to desorb. Zeolites used in this invention are known to adsorb and desorb hydrocarbons at different temperatures. The zeolites adsorb hydrocarbons at ambient temperatures up through about 170°-200° C., with the exact temperature at which the capacity to adsorb ends dependent on the particular zeolite used. Desorption of hydrocarbons begins, again depending on the particular zeolite, at temperatures between about 175° C. and about 250° C. In all cases, however, desorption is generally complete by the time the zeolite reaches a temperature of about 350° C. The present invention utilizes this temperature-dependent adsorption/desorption characteristic of the zeolite.

With particular reference to FIG. 1, the engine exhaust system comprises a zeolite-containing canister, as indicated, in place of the presently-used activated charcoal materials to adsorb hydrocarbon vapors generated by evaporation of fuel in the fuel tank, designated generally as 10. The fuel tank is any standard automotive fuel tank adapted to receive liquid hydrocarbon fuel, and at any given time it will generally contain liquid fuel and hydrocarbon vapors in a vapor space above the liquid. In communication with the liquid space in the tank is a fuel line which provides for passage of the liquid fuel through a standard fuel management system (not shown) that conveys the fuel in appropriate form and in appropriate mixture with air to the engine for combustion. Vapor line 16 provides communication between the vapor space in fuel tank 10 and the zeolite. (As used herein, "line" or "lines" refers to the kind of piping material typically used in a standard exhaust system.) Hydrocarbon vapors generated by evaporation while the engine is idle are vented via line 16, through a check valve as indicated, to the zeolite, which adsorbs and retains the hydrocarbons until the engine is turned on and they can be conveyed to the engine for combustion.

During engine operation, hot exhaust gases are discharged from the engine, generally through an exhaust manifold (not shown), and are conveyed via line 11 to the catalytic converter. The engine exhaust stream is discharged from the converter through line 13 to a heat exchanger, by means of which purge air that will be drawn through the zeolite will be heated so as to heat in turn, the zeolite to its desorption temperature. The engine exhaust stream exits the heat exchanger through line 18, which conveys it to the muffler and then out of the system to the atmosphere via exhaust pipe 19.

Operation of the engine creates a negative pressure at the engine intake, and more particularly in air intake line 17, through which atmospheric air is drawn into the engine for mixture with the fuel to effect combustion. By virtue of the negative pressure generated in air intake line 17, as well as in line 15 communicating with it, atmospheric purge air is drawn to the zeolite material through line 12, first passing through the heat exchanger and line 14, all as shown. In the heat exchanger, the purge air absorbs heat from the hot engine exhaust, and the heated air is discharged through line 14 and to the zeolite. The heat exchanger is sized and designed so that the purge air exits through line 14 at a temperature of at least about 350° C. in sufficient volume to raise the temperature of the zeolite to its desorption temperature in a reasonable period of time, generally within 30–60 seconds. When the zeolite does reach its desorption temperature, the continued passage therethrough of the purge air will cause the hydrocarbons to be desorbed and to be carried by the purge air through line 15 to the intake of the engine for combustion.

The creation of the vacuum at the engine intake can result in negative pressure in the zeolite means. This, in turn, can result in increased evaporation of additional fuel from fuel tank 10, which is in communication with the zeolite means through line 16. Initially, while the zeolite is still below desorption temperature, any such evaporating hydrocarbons will be adsorbed on the zeolite. As engine operation continues and the zeolite reaches its desorption temperature, however, hydrocarbons conveyed to the zeolites through line 16 will be drawn through the zeolite unadsorbed and conveyed with the purge air through line 15 to the intake of the engine, where they will be burned as part of the engine fuel. Optionally, the check valve in line 16 can be replaced by a programmable valve that closes line 16 during engine operation to prevent such generation and suction of hydrocarbon vapors from the fuel tank.

The heat exchanger as depicted schematically in FIG. 1 is preferably of the counter-current kind in which lines 12 and 13 enter at opposite ends of the exchanger and pass in opposite directions through the unit. The heat exchanger can also be of the cross-flow kind, constructed, for example, of a honeycomb structure as shown in U.S. Pat. No. 3,940,301. However, with suitable and conventional alterations of exhaust piping connections, the heat exchanger can also be of the rotary kind, constructed, for example, of a honeycomb structure as shown in U.S. Pat. No. 4,306,611. As a further alternative, the heat exchanger can be of the stationary, parallel-flow kind, constructed, for example, of a honeycomb structure as shown in U.S. Pat. Nos. 4,041,591 and 4,041,592. Optionally, the heat exchanger can contain a catalyst for conversion, such as shown in U.S. Pat. No. 4,089,088, to aid in the conversion of the engine exhaust stream conveyed through the heat exchanger in line 13.

In the embodiment of the invention depicted in FIG. 1, heating means other than the heat exchanger shown can be employed to heat the purge air and thereby raise the zeolite to its desorption temperature. For example, an electric heater powered by the automobile generator can also be used. In such a case, where the heat from the engine exhaust stream in line 13 is not to be used to heat the purge air, the engine exhaust stream is conveyed directly to the muffler and then discharged to the atmosphere.

Figure 2:
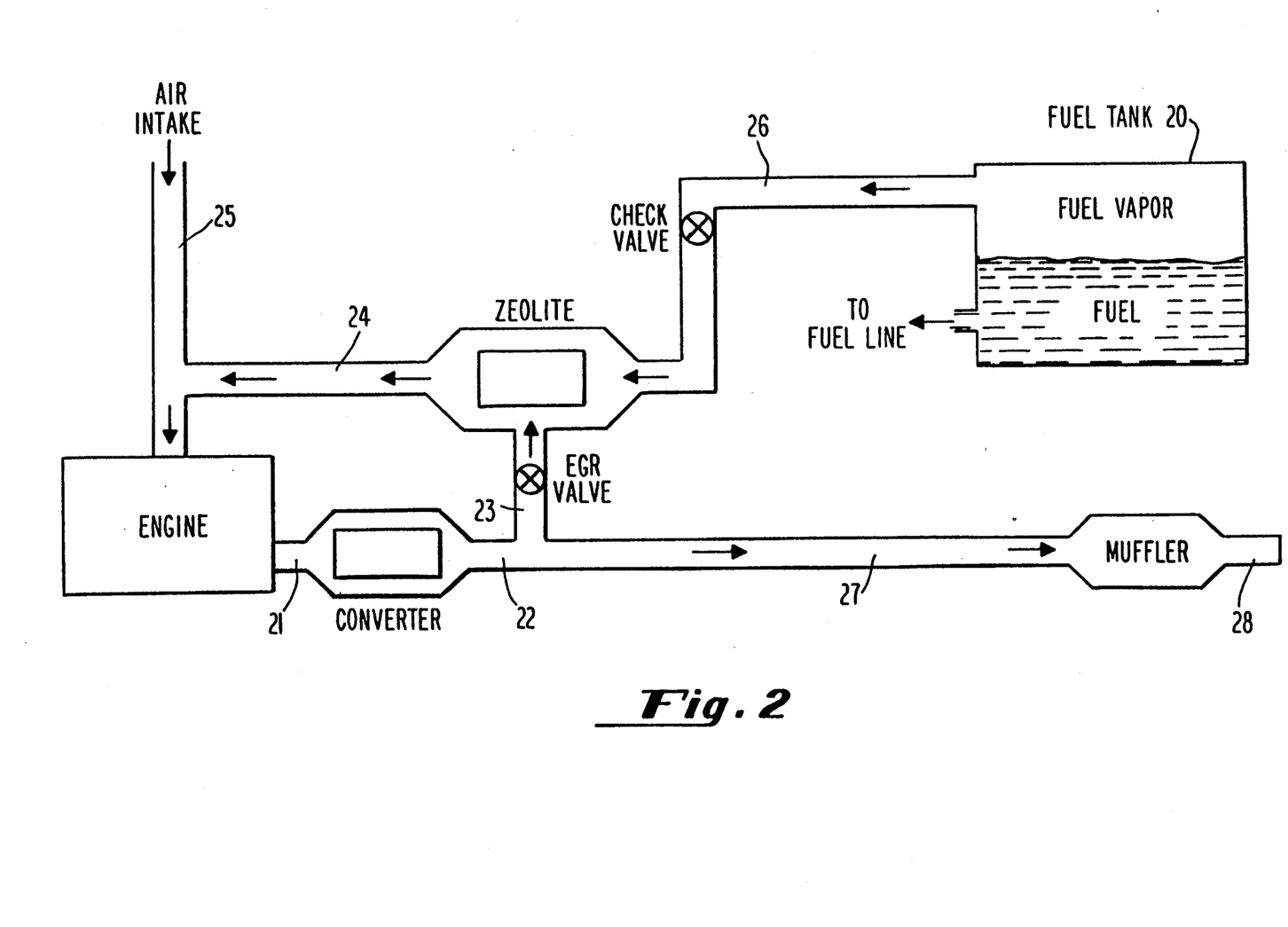
FIG. 2 is a schematic drawing of a variation of the embodiment of FIG. 1 in which a portion of the engine exhaust is recycled through the zeolite to effect purge of the adsorbed hydrocarbons.

In a further embodiment of the invention, schematically depicted in FIG. 2, a portion of the engine exhaust stream, rather than ambient air, is used to purge the zeolite. According to FIG. 2, a zeolite-containing vessel communicates through line 26 with fuel tank 20 to adsorb hydrocarbon vapors generated from the stored fuel through evaporation while the engine is idle, thus preventing the vapors from being vented directly to the atmosphere. According to this embodiment, the zeolite adsorbs and holds such hydrocarbon vapors until they are purged and conveyed back to the engine for combustion, through recirculation of a portion of the engine exhaust stream.

More particularly, during engine operation, hot exhaust gases are discharged from the engine through an exhaust manifold (not shown) and into line 21, which conveys the engine exhaust through the catalytic converter. The exhaust stream exits the converter through line 22, which ultimately bifurcates the engine exhaust into two streams, lines 23 and 27 as shown, the relative flow through which is regulated by an exhaust gas recirculation (EGR) valve situated in line 23. (Although in this particular embodiment the converter is located immediately downstream of the engine and therefore between the engine and the EGR valve, in an alternative arrangement the converter can be situated downstream of the point where the exhaust stream is bifurcated, for example, in line 27.) A major portion of the engine exhaust is discharged through line 27 to the muffler and then out of the system through exhaust pipe 28. Operation of the engine creates negative pressure at the engine intake, and more particularly in air intake line 25, through which atmospheric air is drawn into the engine for mixture with fuel (from the fuel tank) to effect combustion. By virtue of this negative pressure, a portion of the engine exhaust stream in line 22 is drawn through the zeolite, via line 23. The volume of this purge stream is regulated by the EGR valve situated in line 23. The EGR valve as depicted in FIG. 2 is similar in design and operation to those now used in existing emission systems, in which a portion of the engine exhaust is typically recirculated to reduce NOx emissions.

As the exhaust gas conveyed through line 23 passes through the zeolite, it elevates the zeolite temperature to the point at which hydrocarbons from the fuel tank adsorbed on the surface of the zeolite are desorbed and are drawn with the recirculated exhaust gas through line 24 to the intake of the engine for combustion. Because of the negative pressure created at the engine intake, the flow of recirculated exhaust gas through the zeolite will generally always be directed from the zeolite through line 24, and it is unlikely that engine exhaust would pass instead through line 26 back into fuel tank, but line 26 is nonetheless equipped with a check valve to prevent any such back flow. Moreover, as described with respect to the earlier embodiment, the check valve in line 26, which line connects the vapor space of fuel tank 20 with the zeolite, can be replaced by a programmable valve that completely closes line 26 during engine operation so that the engine-generated pressure gradient does not draw further hydrocarbon vapors from the fuel.

As the engine continues to operate and recirculated exhaust in line 23 continues to heat the zeolite, the zeolite will eventually become purged of the previously adsorbed hydrocarbons. At this point, which will generally occur after the zeolite has reached a temperature above about 250° C., the EGR valve can be programmed to close line 23 so that all or substantially all of the engine exhaust gas is conveyed through line 27 to the muffler, and then to discharge from the system through tail pipe 28. Generally, however, the EGR valve will be adjusted so that at least some of the engine exhaust gas is recirculated, as in existing systems, to reduce NOx emissions.

Figure 3:
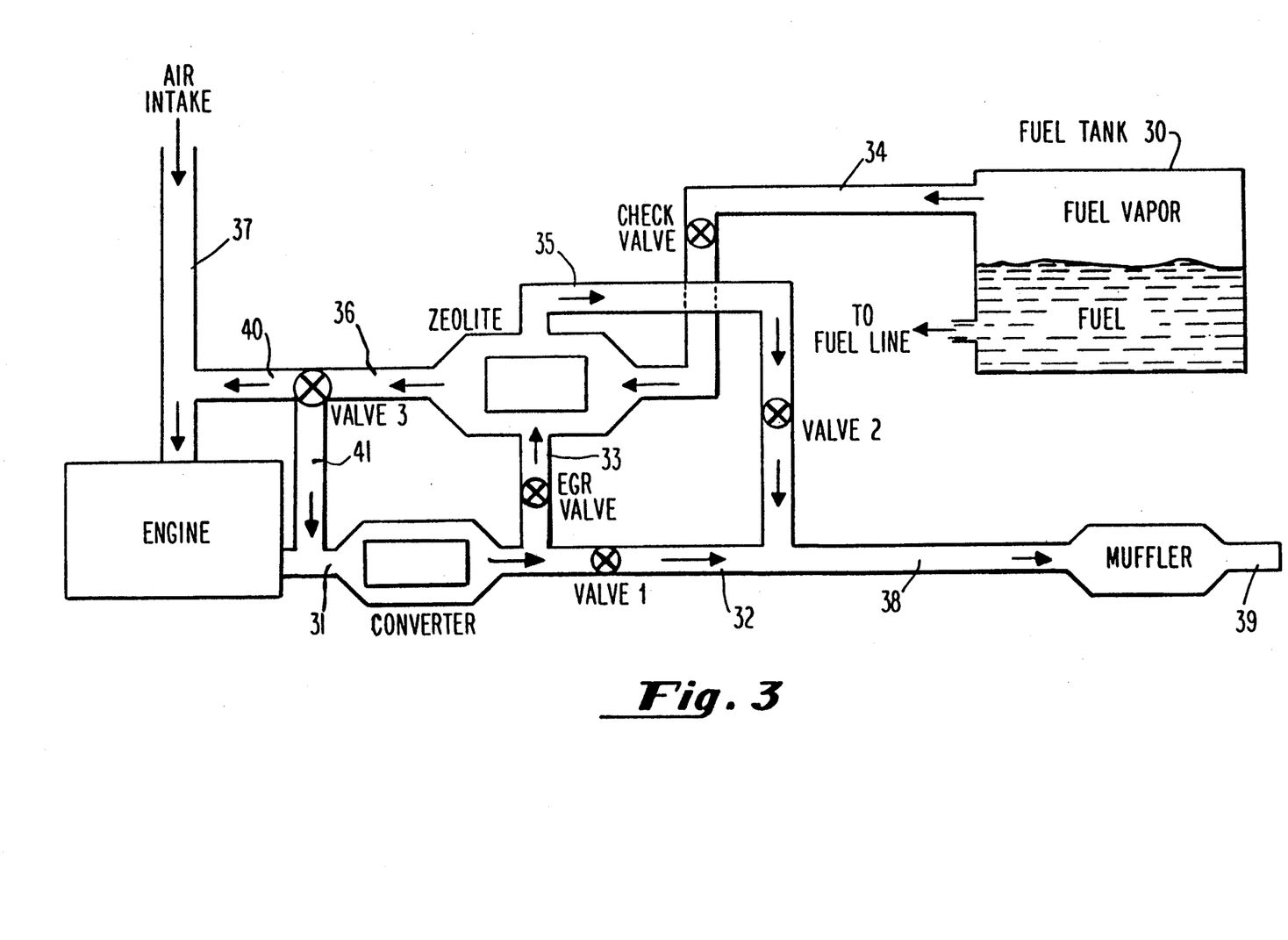
FIG. 3 is a schematic drawing of an engine exhaust system according to the invention in which the zeolite is employed not only to control passive emission from the fuel tank but also to maintain hydrocarbons from the engine exhaust within the system until the catalytic converter reaches an efficient operating temperature.

FIG. 3 schematically depicts another embodiment of the invention, in which the engine exhaust system employs the zeolites not only to adsorb the evaporative emissions from the fuel tank but also to adsorb and hold a substantial portion of the hydrocarbon emissions generated during start-up of the engine, which hydrocarbons might otherwise pass through the system unconverted because the catalyst has not had sufficient time to reach an efficient converting temperature. The system operates to hold these hydrocarbons until both the engine and catalyst are operating more efficiently, at which point the hydrocarbons are recirculated back through the system for further combustion and/or conversion. This embodiment of the invention also takes advantage of the temperature-dependent adsorption/desorption characteristics of the zeolites.

At ambient temperatures, for example, zeolites naturally adsorb several species in addition to the hydrocarbons, such as carbon dioxide and ordinary constituents of air. To the extent the pores of the zeolites are filled with these other species, they are not available to adsorb hydrocarbons. Upon engine start-up, even at cold temperatures, the generated hydrocarbons passing through the zeolite will begin to be adsorbed to the extent that the zeolite pores are vacant. Further, the flow of the exhaust stream through the zeolites will dislodge some of the other gaseous species that may have become adsorbed while the engine was idle, allowing hydrocarbons, for which the zeolites show a preference, to become adsorbed. As the temperature of the zeolite approaches 70° C. (being heated by contact with hot exhaust stream), other species start to desorb rapidly and even more substantial adsorption of the hydrocarbons takes place. Depending on the particular zeolite used, desorption of hydrocarbons commences at a temperature about 175°-250° C., and desorption is generally complete by the time the zeolite reaches a temperature of about 350° C.

According to the embodiment of the invention exemplified in FIG. 3, for a period of time commencing with engine start-up and lasting until the zeolite approaches the temperature at which desorption will begin, the engine exhaust is passed through the converter and then through the zeolite. As the engine exhaust leaves the zeolite, it is bifurcated into two streams: the first stream is a minor portion of the exhaust, which is recirculated to the engine; the second stream is the remaining, major, portion of the exhaust, which is conveyed out of the system. Through this period, during which the converter generally will not yet have reached an efficient operating temperature, any hydrocarbons in the engine exhaust that pass through the converter unconverted will be adsorbed onto the zeolites and thereby held in the system while the converter is further heated, by the continued passage of engine exhaust therethrough, to a higher and more efficient operating temperature.

With more particular reference to FIG. 3, the engine exhaust system comprises a zeolite-containing vessel, a fuel tank generally designated as 30 and a line 34 that provides communication between the vapor space of the fuel tank and the zeolite vessel. Line 34 contains a check valve permitting vapor or gas flow only in the direction indicated, from the tank to the zeolite. The function of the zeolite with respect to hydrocarbon vapors vented from the fuel tank is the same as described above for the earlier embodiments.

During operation of the engine, the engine exhaust is passed from the engine through an exhaust manifold (not shown) and then through the converter via line 31. During the period immediately following engine start-up, thermostatically-controlled valve 1 in line 32 is adjusted to restrict, or shut off entirely, line 32 so that all or substantially all of the exhaust gas from the engine passes through line 33 to the zeolite. The zeolite will generally be at ambient temperature at the time of engine start-up. Although the passage of the hot engine exhaust will eventually raise the zeolite temperature to the point at which it can no longer adsorb hydrocarbons, until such temperature is attained, any hydrocarbons in the engine exhaust will be adsorbed from the stream and held by the zeolite.

As the engine exhaust stream is discharged from the zeolite, it is split into two streams, which selectively pass through line 35 or 36 as indicated. During this start-up period, valve 2 in line 35 is adjusted so that a major portion of the engine exhaust stream will pass through line 35 and then through line 38 to the muffler and out of the system through tail pipe 39. The remaining, minor portion will be recirculated to the engine through lines 36 and 40, and air intake 37 from which it is drawn back into the engine. During this start-up period, the EGR valve is adjusted to close converter recirculation line 41.

The continued passage of the engine exhaust through the zeolite gradually heats it to a temperature at which hydrocarbons are no longer adsorbed, and at which hydrocarbons that had been held by the zeolite start to desorb. Depending on the particular zeolite, this temperature is generally between about 175° C. and 250° C. At this point, valve 2 is adjusted, via thermostatic control, to seal line 35. Valve 1 is coordinately adjusted so that a portion of the engine exhaust leaving the converter is discharged from the system through lines 32 and 38 and the muffler, bypassing the zeolites. The remaining portion of the engine exhaust leaving the converter is recirculated through the zeolite and, with valve 2 closed, is drawn through lines 36 and 40 and air intake 37 back into the engine. Valve 1 is set so that the portion of the exhaust stream recirculated through the zeolite is sufficient to maintain the zeolite at a temperature at which hydrocarbons are desorbed therefrom and to effect desorption of the previously-adsorbed hydrocarbons.

The above-described adjustment to valve 1 and 2 is generally made immediately upon the zeolite's reaching the temperature at which hydrocarbons begin to desorb therefrom. However, an intermediate adjustment of the valves can be made to forestall the desorption of hydrocarbons from the zeolite, providing additional time for the engine and converter to both heat up fully and be operating efficiently. According to this intermediate adjustment, when the zeolites first reach a temperature at which hydrocarbons will begin to desorb, thermostatically-controlled valve 1 is opened and valve 2 closed, thereby conveying all engine exhaust through the converter and thereafter discharging it from the system through lines 32 and 38, the muffler, and tail pipe 39. During the period of this operation, the converter is heated by the continuous flow of engine exhaust therethrough. When the converter reaches its light-off temperature, valve 1 is adjusted so that a portion of the exhaust leaving the converter is recirculated through the zeolite to effect desorption of the previously-adsorbed hydrocarbons as earlier described.

In a further option for operation of the exhaust system during this desorption-recirculation period, the EGR valve can be programmed so that all or a portion of the recirculating exhaust gas that is discharged from the zeolite is conveyed directly to the converter through converter recirculation line 41. The EGR valve is a thermostatically-controlled, three-way valve, and this adjustment can be made when the temperature of the converter exceeds its light-off temperature. If this recirculating stream is to be conveyed directly to the converter, instead of to the engine through the air intake, a venturi, pump, or other pressure-raising means will generally be required at some point in line 41 to generate sufficient pressure.

What is claimed is:

1. An engine exhaust system for reducing evaporative emissions of a hydrocarbon fuel comprising
an engine;
a fuel tank, including a vapor space, for storing hydrocarbon fuel for said engine;
molecular sieve means for adsorbing hydrocarbons evaporating from said fuel, said molecular sieve means being capable of having hydrocarbons desorbed therefrom upon heating to a desorption temperature;
vapor-conveyance means for providing communication between said molecular sieve means and the vapor space of said fuel tank; and
purge means for conveying a heated purge stream through said molecular sieve means and then conveying at least part of said purge stream back to the engine.

2. The engine system of claim 1 in which said purge stream is air drawn from the atmosphere and in which said purge means includes heating means for heating the purge air prior to conveying the purge air to the molecular sieve.

3. The engine system of claim 2 wherein said molecular sieve means comprises zeolite.

4. The engine system of claim 3 wherein said zeolite is a high silica zeolite.

5. The engine exhaust system of claim 3 wherein said molecular sieve means comprises a ceramic substrate coated or embedded with zeolite.

6. The engine system of claim 5 wherein said zeolite is selected from the group consisting of silicalite, ZSM-5, ZSM-8, ZSM-11, ZSM-12, and mordenite.

7. The engine system of claim 6 wherein said ceramic substrate is a honeycomb structure.

8. The engine system of claim 3 wherein said heating means comprises a heat exchanger in which said purge air is heated by absorbing heat from exhaust from the engine.

9. The engine exhaust system of claim 1 in which said purge stream is exhaust from the engine and in which said purge means comprises conveying means for selectively conveying the exhaust stream from said engine within said engine exhaust system, characterized in that, for a period of time at least until said molecular sieve means attains its desorption temperature, said conveying means bifurcates said stream so as to
(i) convey a minor portion of said exhaust stream through said molecular sieve means and thereafter back to said engine, said conveyed portion of said stream being sufficient to raise the temperature of said molecular sieve means to its desorption temperature and to effect desorption of hydrocarbons therefrom; and
(ii) discharge the remainder of said exhaust stream from said system, bypassing said molecular sieve.

10. The engine exhaust system of claim 9 wherein said molecular sieve means comprises zeolite.

11. The engine exhaust system of claim 10 wherein said zeolite is a high silica zeolite.

12. The engine exhaust system of claim 10 wherein said molecular sieve means comprises a ceramic substrate coated or embedded with zeolite.

13. The engine exhaust system of claim 12 wherein said ceramic substrate is a honeycomb structure.

14. The engine exhaust system of claim 12 wherein said zeolite is selected from the group consisting of silicalite, ZSM-5, ZSM-8, ZSM-11, ZSM-12, and mordenite.

15. The engine exhaust system of claim 10 wherein said conveying means comprises at least one thermostatically controlled valve.

16. The engine exhaust system of claim 15 wherein said conveying means operates, for a period of time subsequent to the desorption of hydrocarbons from said zeolite, to discharge substantially all of said engine exhaust from the exhaust system, bypassing said zeolite.

17. The engine exhaust system of claim 1 in which (a) the system further comprises catalytic converter means for substantially converting hydrocarbons in said exhaust stream to water and carbon dioxide, said converter means having a light-off temperature; (b) said purge stream is exhaust from the engine; and (c) said purge means comprises conveying means for selectively conveying said engine exhaust stream within said engine exhaust system, characterized in that said conveying means
(i) for a first period of time until said molecular sieve means attains its desorption temperature, conveys substantially all of the exhaust from said engine through said converter and said molecular sieve means and thereafter bifurcates said exhaust stream so as to discharge a major portion thereof from the system and to recirculate the remainder thereof to said engine; and (ii) for a second period of time thereafter, conveys the exhaust from said engine through said converter means, and thereafter bifurcates said exhaust stream so as to (1) recirculates a portion of said exhaust stream through said molecular sieve means and thereafter to said engine, said recirculated portion being sufficient to maintain said molecular sieve means at least at its desorption temperature and to effect desorption of hydrocarbons therefrom, and (2) discharge the remainder of said stream from said system.

18. The engine exhaust system of claim 17 wherein said molecular sieve means comprises zeolite.

19. The engine exhaust system of claim 18 wherein said zeolite is a high silica zeolite.

20. The engine exhaust system of claim 18 wherein said molecular sieve means comprises a ceramic substrate coated or embedded with zeolite.

21. The engine exhaust system of claim 20 wherein said ceramic substrate is a honeycomb structure.

22. The engine exhaust system of claim 20 wherein said zeolite is selected from the group consisting of silicalite, ZSM-5, ZSM-8, ZSM-11, ZSM-12, and mordenite.

23. The engine exhaust system of claim 18 wherein said conveying means comprises at least one thermostatically controlled valve.

* * * * *